Jan. 27, 1970  H. S. BLOCH  3,492,363
PRODUCTION OF NAPTHALENES
Filed July 5, 1968
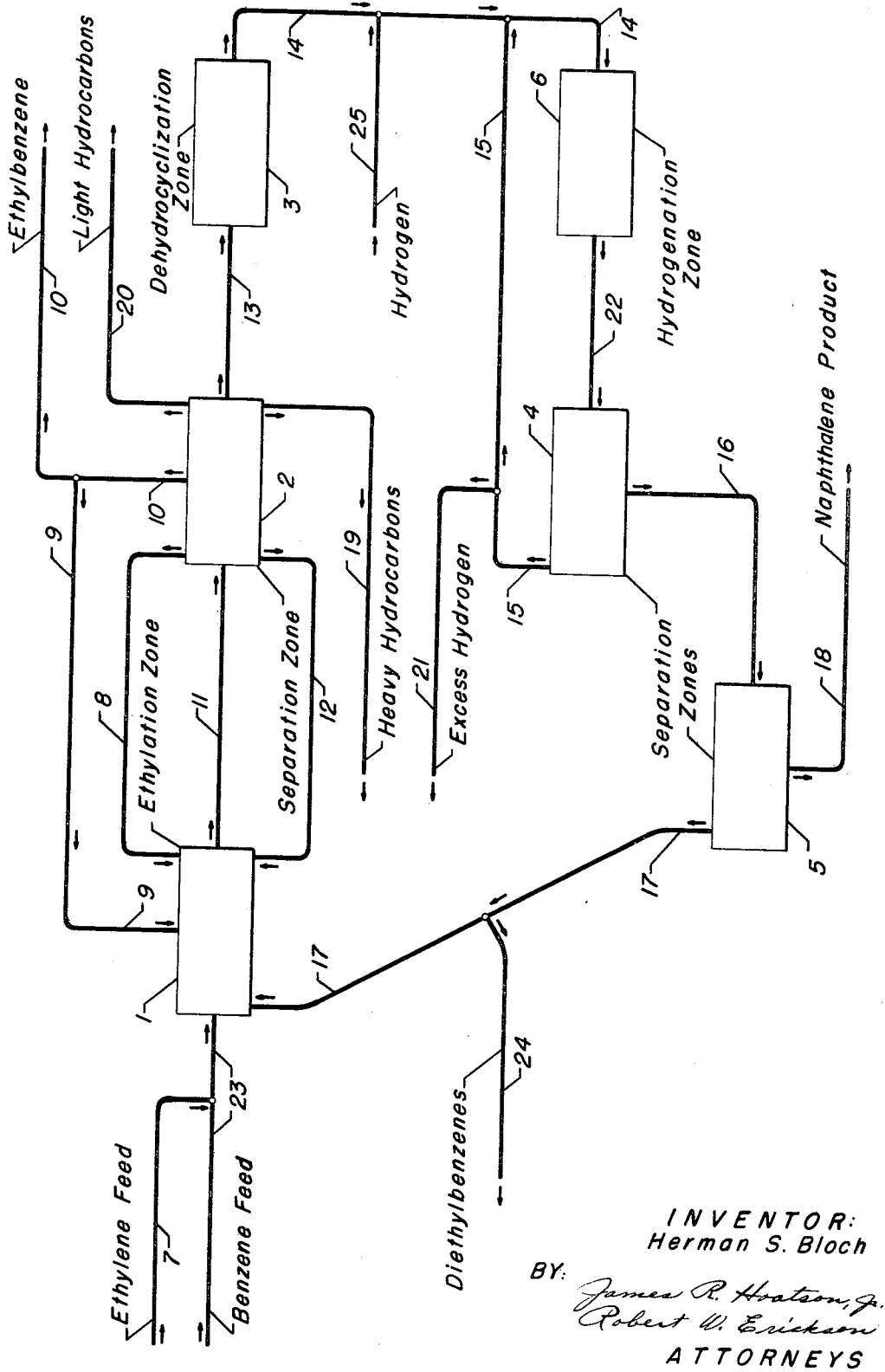
INVENTOR:
Herman S. Bloch
BY: James R. Hoatson, Jr.
Robert W. Erickson
ATTORNEYS United States Patent Office 3,492,363
Patented Jan. 27, 1970

3,492,363
PRODUCTION OF NAPHTHALENES
Herman S. Bloch, Skokie, Ill., assignor to Universal Oil Products Company, Des Plaines, Ill., a corporation of Delaware
Filed July 5, 1968, Ser. No. 742,751
Int. Cl. C07c 15/24
U.S. Cl. 260—668           6 Claims

ABSTRACT OF THE DISCLOSURE

A process for the production of naphthalene which comprises the steps of alkylation of benzene and ethylene to form diethylbenzene isomers and dehydrocyclization of the orthodiethylbenzene isomer to form naphthalene. A portion of the unreacted meta and para-diethylbenzenes are recycled to the alkylation step for partial isomerization to orthodiethylbenzene. The catalysts used in this process comprise modified inorganic refractory oxides.

BACKGROUND OF THE INVENTION

This invention relates to a process for the production of naphthalene using raw materials comprising benzene and ethylene. More specifically this invention relates to a process for naphthalene production wherein benzene is alkylated with ethylene to form ethylbenzene, diethylbenzenes and triethylbenzenes, and the orthodiethylbenzene is then dehydrocyclicized to form naphthalene.

SUMMARY OF INVENTION

It is an object of this invention to reduce overall by-product production of meta and para-diethylbenzene and triethylbenzenes by recycling said by-products to an ethylation zone wherein additional ortho-diethylbenzene is produced by isomerization of the diethylbenzenes. It is still another object of this invention to recycle triethylbenzene to an ethylation zone wherein the triethylbenzene is disproportioned with benzene to form ethylbenzene and diethylbenzene.

Naphthalene is used as an insecticide, antiseptic and for carbureting illumination gases. It is also used as a raw material in the production of aniline dyes, indigo, lamp-black lubricants, naphthols, phthalic acid and naphthyl-amine. Ethylbenzene, which also can be produced as a product of the process of this invention as hereinafter explained, is used as a raw material in organic synthesis and as an intermediate in the production of styrene. Ethyl-benzene is also used as a solvent and organic diluent.

DESCRIPTION OF DRAWING AND PROCESS FLOW

In referring to the attached drawing, benzene in admixture with ethylene flows into the ethylation zone 1 via line 23. The benzene raw material used is preferably in a high purity concentration and should be within a range of over about 90% benzene, and preferably essentially pure benzene of nitration grade or better. The high purity benzene flowing through line 23 meets the ethylene stream flowing through line 7 and the mixture continues to flow to the ethylation zone through line 23. The ethylene stream flowing through line 7 need not be purified or concentrated. Liquid or gaseous streams containing ethylene may be used. Gaseous ethylene streams, when used, generally are diluted with unreactive gases such as hydrogen, nitrogen, methane, ethane, propane, etc. and can be obtained in refineries from various processes including thermal cracking units, catalytic cracking units, thermal reforming units, coking units, polymerization units, etc. Lines 23 and 7 have external flow control means which can vary the ratio of benzene to ethylene charged to ethylation zone 1.

Ethylation zone 1 contains an acidic catalytic composite. Inorganic refractory acidic oxides which may be used include alumina, silica, boria, titanium dioxide, zirconium dioxide, silica-magnesia, silica-magnesia-alumina, silica zirconia, naturally occurring and synthetically prepared crystalline aluminosilicates. The acidity of these may be enhanced by the inclusion of bound halogen, for example as in alumina containing from about 2 to about 5% of bound fluoride. Alumina impregnated with boron-fluoride is also a suitable catalyst, as is likewise aluminum chloride on a solid support. An especially good catalyst also for the ethylation of benzene is "solid phosphoric acid," a calcined composite of phosphoric acid and kieselguhr.

Ethylation zone 1 may alternatively contain a fluid alkylation catalyst, such as for example an aluminum chloride slurry or sludge, with which the reactants are contacted, as by stirring, in the reactor.

The ethylation zone catalytic composite is modified to enhance, in addition to the alkylation reaction of ethylene and benzene, the isomerization of meta and para-diethylbenzenes, and the disproportionation of triethylbenzenes and benzene to form ethyl and diethylbenzenes. The resulting effluent material leaving ethylation zone 1 via line 11 comprises ethylbenzene, diethylbenzenes, triethylbenzenes and unreacted benzene. The ethylation zone effluent mixture flows into separation zone 2. Separation zone 2 is the first of three separation zones used in the process of this invention and separates the ethylation zone effluent into various boiling range fractions by methods understood to those skilled in the art of fractional distillation. The streams separated in the aforementioned separation zone comprise a gaseous stream (line 20), a benzene stream (line 8), an ethylbenzene stream (lines 9 and 10), a diethylbenzene stream (line 13), a triethylbenzene stream (line 12) and a heavy hydrocarbon stream (line 19).

The material flowing through line 13 comprises a diethylbenzenerich stream which flows to the dehydrocyclization zone 3. Materials contained in the ethylation zone effluent boiling at a temperature below benzene are removed from separation zone 2 via line 20. The light hydrocarbon material flowing through line 20 can be vented to the atmosphere, burned as flue gas, used in some other refinery operation requiring light gaseous hydrocarbons or can be condensed to recover the hydrogen present in this stream which can then be used in other refinery operations. The unreacted benzene from the ethylation zone is removed from separation zone 2 via line 8 which recycles the benzene back to the ethylation zone for reuse. The recycle benzene stream flowing back to the ethylation zone is not necessarily a pure benzene stream as the efficiency of the separation taking place in separation zone 2 may allow some overlap individual components being separated.

A stream comprising ethylbenzene is removed from separation zone 2 via line 10. The ethylbenzene can be totally removed from the process via line 10 if it is desired to collect ethylbenzene as a product of the process. However, if ethylbenzene is not a desirable product a portion or all of the ethylbenzene removed from separation zone 2 may be recycled via line 9 to ethylation zone 1 for further alkylation to di-or triethylbenzenes.

A stream comprising triethylbenzene or higher polyethylbenzenes is removed from separation zone 2 via line 12 and recycled to ethylation zone 1 for disproportionation with benzene to form ethyl and diethylbenzenes. Line 19 carries any heavy hydrocarbon compounds formed that boil at temperatures higher than the recycled polyethylbenzenes. The heavy hydrocarbon material flowing through line 19 is removed from the process as by-product. The production of heavy aromatic compounds in ethylation zone 1 is minimal, generally being less than 10 wt. percent of the naphthalenes and other useful products ultimately produced as products of the present process. It is preferred to operate the ethylation zone at conditions to minimize heavy aromatic production.

Line 13 carries a stream comprising diethylbenzenes (ortho, meta and para isomers) from the first separation zone 2 to hedydrocyclization zone 3. Dehydrocyclization zone 3 contains a catalytic composite comprising an inorganic refractory oxide modified with at least one metal selected from the group consisting of chromium, molybdenum, tungsten, cobalt, rhodium, iridium, nickel, palladium and platinum. Inorganic refractory oxides which may be used include activated carbon, alumina, silica, both naturally occurring and synthetically prepared aluminosilicates, boria, magnesia, silica-magnesia, etc. The ortho-isomers of the diethylbenzene stream contacting the dehydrocyclization zone catalyst is converted to naphthalene while the meta and para-diethylbenzenes pass through the dehydrocyclization zone remaining essentially unreacted, or are converted to the corresponding vinyl derivatives. The effluent from dehydrocyclization zone 3 comprises hydrogen, naphthalene, meta and para-diethylbenzene and vinyl benzenes and flows via line 14 to hydrogenation zone 6. Additional hydrogen may be added via line 25. Hydrogenation zone 6 effects the saturation of any vinyl benzene hydrocarbons formed in the dehydrogenation zone. Catalysts which are utilized in the hydrogenation zone comprise metals selected from the group consisting of platinum, palladium, osmium, nickel, rhodium, ruthenium, iridium; or combinations such as copper chromite, nickel molybdate, cobalt vanadate, and the like. These are used at conditions selective for the hydrogenation of olefinic unsaturation but not of aromatic rings. Said metals are deposited on carriers such as charcoal, alumina or inorganic refractory oxides such as those previously mentioned in describing the hydrogenation zone catalyst. Separation zone 4 effects the separation of the hydrogenation zone effluent flowing through line 22 into gaseous and liquid streams. The gaseous stream which comprises hydrogen flows out of separation zone 4 via line 15 and is recycled to hydrogenation zone 6 via line 14 wherein the gaseous stream mixes intimately with the dehydrocyclization zone effluent. A portion of gaseous stream flowing from separation zone 4 via line 15 can be removed from the process via vent line 21. The liquid stream flowing from separation zone 4 via line 16 to a third separation zone comprises meta and para-diethylbenzenes and naphthalene.

Separation zone 5 separates, by methods known to those familiar with the art of fractional distillation, naphthalene and para and metadiethylbenzene. The higher boiling naphthalene flows out of separation zone 5 via line 18 to be collected as product. The para and meta-diethylbenzenes flow out of separation zone 5 via line 17 with at least a portion recycled to ethylation zone 1. The para and meta-diethylbenzenes not recycled to ethylation zone 1 are withdrawn from the process via line 24 and collected or processed further.

In operating the above mentioned process the ethylation zone is operated at conditions which include a temperature within the range of from about 50° C. to about 400° C. (depending on the catalyst employed) and preferably in the range of from about 150° C. to about 350° C. with solid acidic catalysts and 75° to 150° with aluminum chloride catalysts. The pressure lies within the range of from about 100 p.s.i.g. to about 1500 p.s.i.g. and preferably in the range of from about 250 p.s.i.g. to about 1000 p.s.i.g., the pressure being sufficient to maintain a major portion of the reactants in the liquid phase.

Also in the aforementioned process the dehydrocyclization zone is operated at conditions which include a temperature within the range of from about 300° C. to about 600° C. and preferably in the range of from about 350° C. to about 500° C., and a pressure within the range of from about 10 p.s.i.g. to about 500 p.s.i.g. and preferably within the range of from about 30 p.s.i.g. to about 300 p.s.i.g.; the hydrogenation is effected at conditions which include a temperature within the range of from about 25° C. to about 250° C., a preferred temperature range of from about 50° C. to about 150° C. and a pressure within the range of from about atmospheric to about 1500 p.s.i.g. and preferably within the range of from about 100 p.s.i.g. to about 1000 p.s.i.g.

It is contemplated that heat exchange equipment can be used on various lines that flow into or out of the different reaction and separation zones. If a high heat requirement is needed for a reaction or separation zone, the heat exchange equipment could be used to bring input streams up to the desired temperature. In a like manner input streams can be cooled prior to introduction into a zone. Output streams from the process can be contacted with heat exchange equipment to recover specific heat from each particular stream.

It is also contemplated, where zones are operated at different pressures, that pumps and compressors can be used to bring a lower pressure stream up to a higher pressure for continuous flow. Where a stream of higher pressure flows into a lower pressure zone a throttling valve or other suitable means can be used to control flow when required.

In starting the process, benzene and ethylene are allowed to flow into the ethylation zone where alkylation of the ethylene and benzene takes place. The mole ratio of ethylene over benzene flowing into the ethylation zone is controlled by varying the charge rate of the benzene (line 23) and ethylene (line 7). The mole ratio of ethylene over benzene is kept within a range of from about $\frac{1}{10}$ to about 1 to yield the desired distribution of products. Products of reaction, although not necessarily all desired products, include ethylbenzene, the ortho, meta and para-diethylbenzenes, the triethylbenzene isomers and various higher-boiling compounds.

The products of reaction passing from the ethylation zone and unreacted materials passing through the ethylation zone are separated with portions of the separated components being recycled back to the ethylation zone for further conversion. The materials boiling below benzene are removed from the process. These light components comprise hydrogen, methane, ethane, etc. The heavy hydrocarbons produced in the ethylation zone may include some polycyclic aromatic hydrocarbons, containing more than 12 carbon atoms per molecule and may be removed from the process as drag stream material from separation zone 2.

The triethylbenzenes produced in the ethylation zone are recycled to the ethylation zone for transethylation with benzene to form ethyl and diethyl benzenes. A portion of the ethylbenzenes produced in the ethylation zone are recycled to the ethylation zone for further alkylation with ethylene to form primarily diethylbenzene isomers, while the portion of ethylbenzene not recycled to the ethylation zone is collected as one of the products of the process.

The diethylbenzene isomers produced in the ethylation zone are then passed through the dehydrocyclization zone wherein the ortho-diethylbenzene isomer is converted to naphthalene. A small portion of the para and meta-diethylbenzenes passed through the dehydrocyclization zone are dehydrogenated to vinyl benzene compounds.

The effluent from the dehydrocyclization zone comprises para and meta diethylbenzene, naphthalene, vinyl benzene hydrocarbons and hydrogen. The dehydrocyclization zone effluent is then passed to a mild hydrogenation zone in admixture with hydrogen so that the small portion of vinyl benzene produced in the dehydrocyclization zone can be hydrogenated to an alkylbenzene material.

The effluent from the hydrogenation zone is then passed to a separation zone wherein a gaseous hydrogen phase is separated from a liquid phase. A portion of the gaseous hydrogen phase is recycled to the hydrogenation zone. The gaseous hydrogen phase not recycled to the hydrogenation zone is removed from the process via line 21.

The remaining liquid phase then passes to a separation zone where the naphthalene and para and meta-diethylbenzenes are separated via fractional distillation into a high purity naphthalene product stream and a stream of para and meta-diethylbenzenes a portion of which is recycled to the ethylation zone for partial isomerization to ortho-diethylbenzene.

DESCRIPTION OF PREFERRED EMBODIMENTS

A broad embodiment of the process of this invention resides in a process for the production of naphthlene which comprises the steps of: (a) reacting benzene and ethylene in an ethylation zone at conversion conditions selected to effect the production of alkylaromatic compounds comprising ethylbenzene, diethylbenzene and triethylbenzene; (b) passing the effluent stream from said ethylation zone into a first separation zone from which zone streams comprising benzene, ethylbenzene, diethylbenzene and triethylbenzene are withdrawn; (c) recycling at least a portion of the benzene and triethylbenzene streams withdrawn from said separation zone to the ethylation zone; (d) passing the diethylbenzene stream withdrawn from said first separation zone through a dehydrocyclization zone at reaction conditions to effect the dehydrocyclization of ortho-diethylbenzene to naphthalene; (e) passing the effluent from the dehydrocyclization zone in admixture with a gaseous hydrogen stream into a hydrogenation zone at reaction conditions to effect the situation of unsaturated side chains of vinylbenzenes produced in the dehydrocyclization zone; (f) passing the effluent from the hydrogenation zone into a second separation zone from which a gaseous stream comprising hydrogen and a liquid stream comprising naphthalene, meta-diethylbenzene and para-diethylbenzene are withdrawn; (g) passing said liquid stream withdrawn from said second separation zone into a third separation zone from which liquid streams comprising naphthalene, and para and meta-diethylbenzene are withdrawn; and, (h) recycling at least a portion of the para and meta-diethylbenzene stream withdrawn from said third separation zone to the ethylation zone.

Another embodiment of the process of this invention resides in operating the ethylation zone at reaction conditions to include a temperature within the range of from about 50° C. to about 400° C., a pressure within the range of from about 100 p.s.i.g. to about 1500 p.s.i.g. and a mole ratio of benzene over ethylene feed to the ethylation zone within a range of from about 1 to about 10.

Another embodiment of the process of this invention resides in operating the dehydrocyclization zone at reaction conditions to include a temperature within the range of from about 300° C. to about 600° C. and a pressure within the range of from about 10 p.s.i.g. to about 500 p.s.i.g.

Still another embodiment of the process of the invention resides in operating the hydrogenation zone at reaction conditions to include a temperature within the range of from about 25° C. to about 250° C. and a pressure within the range of from about atmospheric to about 1500 p.s.i.g.

What is claimed is:

1. A process for the production of naphthalene which comprises the steps of:
  (a) reacting benzene and ethylene in an ethylation zone at conversion conditions selected to effect the production of alkylaromatic compounds comprising ethylbenzene, diethylbenzene and triethylbenzene;
  (b) passing the effluent stream from said ethylation zone into a first separation zone from which zone streams comprising benzene, ethylbenzene, diethylbenzene and triethylbenzene are withdrawn;
  (c) recycling at least a portion of the benzene and triethylbenzene streams withdrawn from said first separation zone to the ethylation zone;
  (d) passing the diethylbenzene stream withdrawn from said first separation zone through a dehydrocyclization zone at reaction conditions to effect the dehydrocyclization of ortho-diethylbenzene to naphthalene;
  (e) passing the effluent from the dehydrocyclization zone in admixture with a gaseous hydrogen stream into a hydrogenation zone at reaction conditions to effect the saturation of unsaturated side chains of vinylbenzenes produced in the dehydrocyclization zone;
  (f) passing the effluent from the hydrogenation zone into a second separation zone from which a gaseous stream comprising hydrogen and a liquid stream comprising naphthalene, meta-diethylbenzene and para-diethylbenzene are withdrawn;
  (g) passing said liquid stream withdrawn from said second separation zone into a third separation zone from which liquid streams comprising naphthalene, and para- and meta-diethylbenzene are withdrawn; and
  (h) recycling at least a portion of the para- and meta-diethylbenzene stream withdrawn from said third separation zone to the ethylation zone.

2. The process of claim 1 further characterized in that at least a portion of the ethylbenzene stream withdrawn from the first separation zone is recycled to the ethylation zone.

3. The process of claim 1 further characterized in that in said ethylation zone the feed and recycle streams entering said zone contact an inorganic refractory oxide catalytic composite.

4. The process of claim 1 further characterized in that in said dehydrocyclization zone the diethylbenzene stream entering said zone contacts an inorganic refractory oxide catalytic composite containing at least one metal selected from the group consisting of chromium, molybdenum, tungsten, cobalt, rhodium, iridium, nickel, palladium and platinum.

5. The process of claim 1 further characterized in that said ethylation zone is operated at reaction conditions to include a temperature within the range of from about 50° C. to about 400° C., a pressure within the range of from about 100 p.s.i.g. to about 1500 p.s.i.g. and a mole ratio of benzene over ethylene fed to the ethylation zone within a range of from about 1 to about 10.

6. The process of claim 1 further characterized in that said dehydrocyclization zone is operated at reaction conditions to include a temperature within the range of from about 300° C. to about 600° C., a pressure within the range of from about 10 p.s.i.g. to about 500 p.s.i.g.

References Cited

UNITED STATES PATENTS

| | | | |
|---|---|---|---|
| 2,436,932 | 3/1948 | Mattox | 260—668 |
| 2,531,328 | 11/1950 | Elwell | 260—668 |
| 2,916,529 | 12/1959 | Sanford et al. | 260—668 |
| 3,197,517 | 7/1965 | Soderquist et al. | 260—668 |

DELBERT E. GANTZ, Primary Examiner

CURTIS R. DAVIS, Assistant Examiner

U.S. Cl. X.R.

260—671